3,229,446
COMBUSTION INHIBITING METHOD

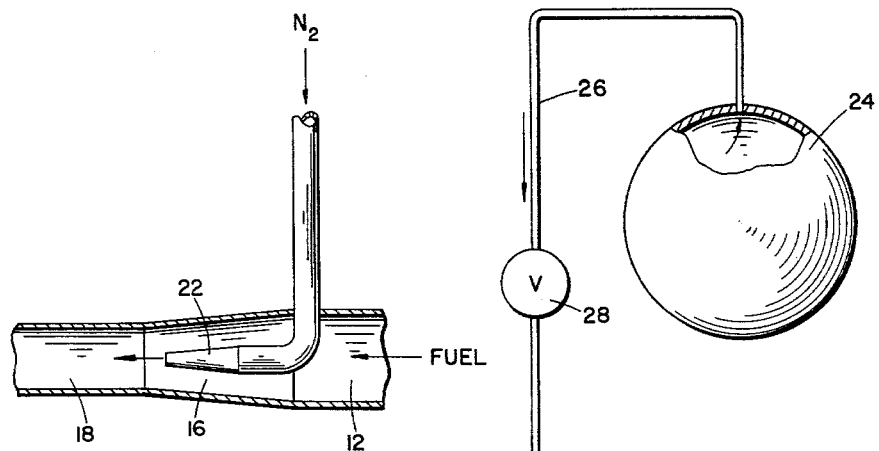
FIG. 2
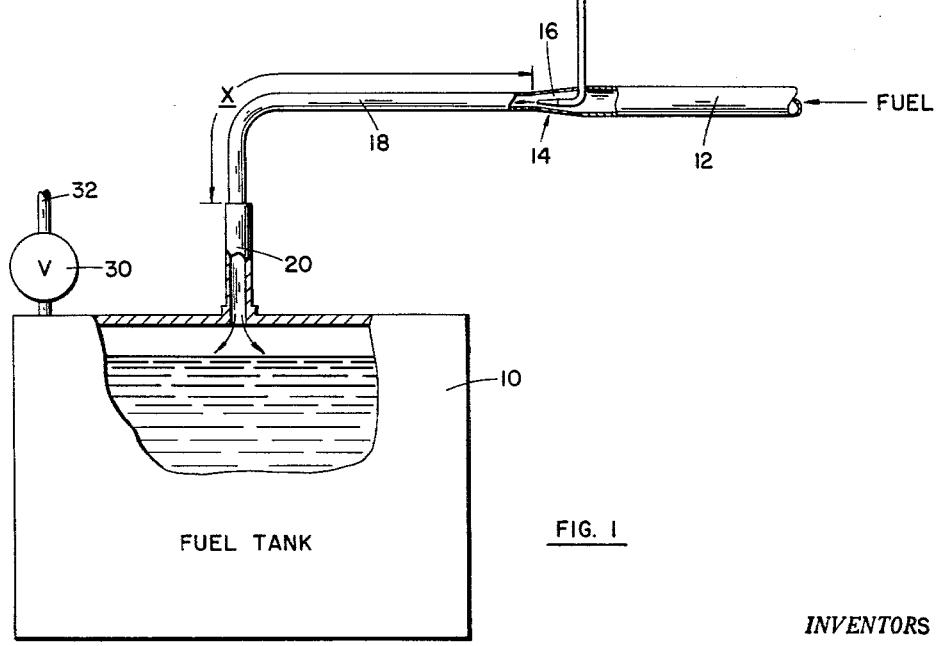
FIG. 1
INVENTORS
CHARLES R. SEBASTIAN
GEORGE A. PATTERSON JR.
BY
ATTORNEY

United States Patent Office 3,229,446
Patented Jan. 18, 1966

Charles R. Sebastian, Los Angeles, and George A. Patterson, Jr., Palos Verdes, Calif., assignors, by mesne assignments, to the United States of America as represented by the Secretary of the Air Force
Filed Jan. 29, 1963, Ser. No. 254,738
2 Claims. (Cl. 55—53)

This invention concerns a method for inhibiting combustion in connection with storage, handling and use of flammable liquids. More particularly, this invention pertains to a novel method for reducing combustion or explosion hazards in connection with liquid fuels.

Although the invention in this case is applicable to diverse liquids in containers of different function or shape, it will be described for the sake of illustration in connection with liquid fuels used in high speed aerial or orbital vehicles. It will be understood that the scope of the inventive concept is not limited by the specific details used to explain the invention, except as determined by the claims in this case.

Design of components such as wings in vehicles of the stated type requires efficient use of all available space due to the extremely complex and crowded internal conditions characterizing such vehicles, and avoidance of all unnecessary weight. A common expedient in achieving optimum vehicle size and overall weight is the use of compartments formed by internal bulkheads and other necessary bracing within basic aerodynamic elements such as wings and fuselage for the containment of fuel. However, this results in gradual absorption by the fuel thus contained of heat originating in the surrounding structure during vehicle operation. In the case of vehicles, the operation of which involves impact or friction heat during reentry or high speed flight through the atmosphere, the skin surfaces and supporting structure therefor in vehicles of the stated class may and often do become very hot, whereby the fuel situated closely proximate to such surfaces and structure may absorb a considerable amount of heat.

Because of the generally fragile nature of the skin surfaces and supporting structure in vehicles wherein weight savings are of critical overriding importance, extensive use of reinforced panels such as thin-gage steel honeycomb sandwich type panels is often made in bulkheads and compartments of the type mentioned above. As a result, continuous and effective venting of internal compartments is necessary to equalize the pressure therein with surrounding atmospheric pressure, thus avoiding differential pressures across the compartment walls. Venting of pressure within compartments containing fuel exposes the fuel to pressure which, depending upon the altitude and fuel temperature involved in operation of a particular vehicle, may fall below the pressure at which boiling of the particular fuel occurs. Such boiling liberates oxygen which normally becomes dissolved in the fuel during ground handling thereof prior to flight. Depending upon the amount of oxygen previously dissolved and the rate of its liberation from the stated causes, an explosive mixture of volatile fuel constituents with such oxygen may thus be created within the ullage space of the fuel cells. In view of the elevated temperatures which may occur in fuel compartment walls or related structures as discussed above, a mixture of the stated type is of especially great concern due to the possibility of autoignition.

Accordingly, it is a principal object of this invention to provide an improved method of preventing an explosive mixture of flammable gases and oxygen in the ullage space of a container having a liquid therein, It is another object in this case to provide an improved method for rendering a relatively volatile liquid less dangerous due to explosion in storage.

It is a further object of this invention to provide an improved method according to the objects stated above adapted for use in rapid replenishing of fuel tanks in aerial or space vehicles.

Other objects and advantages of the instant invention will become apparent upon a close reading of the following detailed description of an illustrative embodiment of the invention, reference being had to the accompanying drawing, wherein:

FIGURE 1 shows an illustrative embodiment of the inventive concept disclosed herein with components schematically representing a container being filled with a relatively volatile liquid, and FIGURE 2 is an enlarged view, partly in cross section and broken away showing an isolated portion of the structure of FIGURE 1.

With reference to the drawing described above and particularly to FIGURE 1, the apparatus utilized for practicing the inventive concept may be seen to include liquid containing means in the form of tank 10, the purpose or environment for which is not material to the scope of this invention. For the sake of illustration, tank 10 may be envisioned as a fuel tank in a modern high speed aircraft, in the normal operation of which the liquid level in tank 10 is lowered so that periodic replenishing thereof is necessary. The schematic showing of FIGURE 1 includes conduit means 12 connected to a source of relatively volatile liquid (not shown) and serving to connect the stated source with tank 10 through nozzle means 14. Nozzle means 14 includes a mixing chamber portion 16 and an outlet portion 18, the distal end of which is adapted to cooperate with a tank inlet 20 whereby liquid may flow through conduit 12, nozzle means 14 and inlet 20 into container 10. Nozzle means 14 is provided with a fluid outlet 22 communicating with a fluid source 24 through conduit means 26 and valve 28. Fluid emitted from outlet 22 is injected into the liquid flowing through chamber 16 and thence through nozzle outlet portion 18. The length of which, indicated by the dimension X in FIGURE 1, should be as long as practicable.

In operation, during replenishing liquid flow through conduit 12 and nozzle means 14, valve 28 may be selectively opened to permit flow of a suitable fluid such as nitrogen gas under pressure from source 24 through conduit means 26 into outlet means 22 rigidly mounted and axially centered within mixing chamber 16. The stated fluid exiting from outlet 22 mixes violently with the liquid from conduit 12, particularly due to the turbulent flow which characterizes passage of the stated liquid through nozzle outlet portion 18. Thus, it may be seen from FIGURE 2, for example, that portion 18 is of less diameter than conduit 12 . The lesser cross-sectional area of portion 18 is intended to insure that liquid flow through portion 18 will be characterized by high Reynolds number effects such as extreme turbulence whereby rapid and complete mixing of the fluid from outlet 22 with liquid from conduit 12 occurs in portion 18. Where various hydrocarbon type fuels such as kerosene, for example, having oxygen dissolved therein are conducted through conduit 12 and nitrogen gas under pressure issues from outlet 22 and is mixed with the fuel in portion 18, the nitrogen becomes dissolved in the fuel and displaces the dissolved oxygen which is liberated into the atmosphere as the fuel enters tank 10. Depending upon the volumetric rate of fuel flow through conduit 12, the rate of fluid flow through injector outlet 22 should be more than sufficient to saturate the amount of fuel with which the gas is mixed. Venting means are provided on tank 10 as indicated by selectively operable valve 30 and vent outlet 32 communicating with the surrounding atmosphere external of container 10.

The method illustratively described above has been found to provide distinct advantages not heretofore achieved to the extent disclosed herein. For example, during replenishing fuel flow characterized by extremely high liquid pressures and flow rates in the case of huge tanks containing in modern supersonic aerial vehicles, vast quantities of fuel may be inerted by supersaturation with nitrogen to eliminate substantially all oxygen from the fuel at the time that such tanks are serviced before flight. Due to supersaturation of such fuel, and since discharge of the mixture into the tank is accompanied by sudden release of pressure from the liquid fuel, nitrogen and oxygen gases bubble out of solution therewith and collect in the vent space. The nitrogen rich gas mixture thus released from the fuel displaces the air in the ullage space and forces most of it out the vent line. Later, with the vehicle in flight in rarified or otherwise high altitude air conditions, boiling of the fuel in the tanks will not release enough oxygen to form an explosive mixture in the fuel tanks. This result is achieved without complex inerting systems involved additional weight to the air vehicle such as required for continuous purging of the fuel tanks and vent system during operation of the vehicle as known to the prior art.

While the particular structural details set forth herein are capable of attaining the objects and providing the advantages herein stated, the structure and method thus disclosed are merely illustrative and could be varied or modified to produce the same results without departing from the scope of the inventive concept as defined in the appended claims.

We claim:
1. A method of inerting a relatively large quantity of flammable liquid having oxygen dissolved therein by removing at least some of said oxygen from said liquid, said method comprising:
flowing said liquid through a tubular conduit at a pressure greater than atmospheric pressure,
compressing said flow of said liquid in said conduit sufficiently to produce a flow characterized by a Reynolds number in the turbulent range,
injecting a stream of inert gas more soluble than oxygen and at least partially soluble in said liquid into said flow simultaneously during said compression, and substantially at the axial center of said liquid flow, and thereafter exposing said liquid to atmospheric pressure to remove oxygen.

2. A method of rapidly inerting a relatively large quantity of hydrocarbon fuel having oxygen dissolved therein by removing at least some of said oxygen from said fuel during flow of said fuel into a fuel tank, said method comprising:
flowing said fuel through a tubular nozzle at a pressure greater than atmospheric pressure,
compressing said flow of said fuel in said nozzle sufficiently to produce a flow characterized by a Reynolds number in the tubulent range,
injecting a stream of nitrogen into said flow simultaneously during said compression in said nozzle, substantially at the axial center of said tubular nozzle, and at a rate sufficient to supersaturate said fuel, and thereafter
exposing said liquid to atmospheric pressure in said fuel tank to remove oxygen.

References Cited by the Examiner

UNITED STATES PATENTS

| | | | |
|---|---|---|---|
| 694,305 | 2/1902 | Branch | 158—5.1 |
| 2,104,759 | 1/1938 | Randel | 55—37 |
| 2,191,864 | 2/1940 | Schaefer | 216—116 |
| 2,338,044 | 12/1943 | Lanser | 261—78 |
| 2,413,102 | 12/1946 | Ebert et al. | 55—55 |
| 2,718,275 | 9/1955 | Banks | 55—53 |
| 2,792,903 | 5/1957 | Hoff | 55—68 |
| 2,809,819 | 10/1957 | Losada | 261—78 |
| 2,983,405 | 5/1961 | Taylor | 158—50.1 |
| 3,063,686 | 10/1962 | Irwin | 261—118 |
| 3,073,093 | 1/1963 | Baker et al. | 55—56 |
| 3,132,013 | 5/1964 | Kumamoto et al. | 55—53 |

FOREIGN PATENTS 478,679  11/1951  Canada.

REUBEN FRIEDMAN, *Primary Examiner.*

B. NOZICK, *Examiner.*